(12) United States Patent
Karmarkar et al.

(10) Patent No.: US 8,509,826 B2
(45) Date of Patent: *Aug. 13, 2013

(54) BIOSENSOR MEASUREMENTS INCLUDED IN THE ASSOCIATION OF CONTEXT DATA WITH A TEXT MESSAGE

(75) Inventors: Amit Karmarkar, Palo Alto, CA (US); Sharada Karmarkar, Palo Alto, CA (US)

(73) Assignee: Buckyball Mobile Inc, Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/691,705

(22) Filed: Jan. 21, 2010

(65) Prior Publication Data
US 2010/0120456 A1    May 13, 2010

Related U.S. Application Data

(63) Continuation-in-part of application No. 12/422,313, filed on Apr. 13, 2009, which is a continuation-in-part of application No. 11/519,600, filed on Sep. 11, 2006, now Pat. No. 7,551,935, which is a continuation-in-part of application No. 11/231,575, filed on Sep. 21, 2005, now Pat. No. 7,580,719.

(60) Provisional application No. 61/161,763, filed on Mar. 19, 2009.

(51) Int. Cl.
*H04W 4/14* (2009.01)

(52) U.S. Cl.
USPC ............................ 455/466; 370/328; 370/349

(58) Field of Classification Search
USPC .......................................................... 455/466
See application file for complete search history.

(56) References Cited

U.S. PATENT DOCUMENTS

| | | | |
|---|---|---|---|
| 4,959,785 A | 9/1990 | Yamamoto et al. | |
| 5,493,692 A | 2/1996 | Theimer et al. | |
| 5,517,409 A | 5/1996 | Ozawa et al. | |
| 5,797,098 A | 8/1998 | Schroeder et al. | |
| 5,818,447 A * | 10/1998 | Wolf et al. | 715/752 |
| 6,169,911 B1 * | 1/2001 | Wagner et al. | 455/566 |
| 6,405,225 B1 * | 6/2002 | Apfel et al. | 715/210 |
| 6,473,621 B1 | 10/2002 | Heie | |
| 6,560,456 B1 | 5/2003 | Lohtia et al. | |
| 6,704,772 B1 * | 3/2004 | Ahmed et al. | 709/207 |

(Continued)

FOREIGN PATENT DOCUMENTS

WO    WO-2007104487    9/2007

OTHER PUBLICATIONS

U.S. Appl. No. 11/742,242, filed Apr. 2007, Maloney, David.

(Continued)

*Primary Examiner* — Lester Kincaid
*Assistant Examiner* — Diego Herrera

(57) ABSTRACT

Disclosed are a system, method, and article of manufacture of an association of context data with a text-message component. A context data is associated with a text-message component. The association between the context data and the text-message component may be indicated with a user interface. The association between the context data and the text-message component may be embedded in a text-message signal. The association between the context data and the text-message component may be embedded in a short message service (SMS) signal.

25 Claims, 10 Drawing Sheets

(56) References Cited

U.S. PATENT DOCUMENTS

| | | | |
|---|---|---|---|
| 6,731,940 B1 | 5/2004 | Nagendran | |
| 6,750,883 B1 | 6/2004 | Parupudi et al. | |
| 6,785,869 B1* | 8/2004 | Berstis | 715/210 |
| 6,813,507 B1 | 11/2004 | Gress et al. | |
| 6,816,578 B1 | 11/2004 | Kredo et al. | |
| 6,847,892 B2* | 1/2005 | Zhou et al. | 701/213 |
| 6,898,518 B2 | 5/2005 | Padmanabhan | |
| 6,963,839 B1 | 11/2005 | Ostermann et al. | |
| 6,964,020 B1 | 11/2005 | Lundy | |
| 6,966,035 B1 | 11/2005 | Suess et al. | |
| 6,990,180 B2 | 1/2006 | Vuori | |
| 6,993,553 B2 | 1/2006 | Kaneko et al. | |
| 6,996,520 B2* | 2/2006 | Levin | 704/10 |
| 7,013,155 B1* | 3/2006 | Ruf et al. | 455/466 |
| 7,072,956 B2 | 7/2006 | Parupudi et al. | |
| 7,155,173 B2* | 12/2006 | Leung et al. | 455/72 |
| 7,177,902 B2 | 2/2007 | Hubbard | |
| 7,181,387 B2 | 2/2007 | Ju et al. | |
| 7,207,004 B1 | 4/2007 | Harrity | |
| 7,254,773 B2 | 8/2007 | Bates et al. | |
| 7,272,406 B2 | 9/2007 | Chava et al. | |
| 7,293,074 B1 | 11/2007 | Jellinek et al. | |
| 7,305,230 B2 | 12/2007 | Zhigang | |
| 7,315,902 B2 | 1/2008 | Kirkland | |
| 7,328,251 B2* | 2/2008 | Ahmed et al. | 709/207 |
| 7,346,501 B2* | 3/2008 | Mathur et al. | 704/206 |
| 7,359,714 B2 | 4/2008 | Parupudi et al. | |
| 7,363,357 B2 | 4/2008 | Parupudi et al. | |
| 7,366,500 B1* | 4/2008 | Yalovsky et al. | 455/414.1 |
| 7,424,682 B1 | 9/2008 | Pupius et al. | |
| 7,503,007 B2* | 3/2009 | Goodman et al. | 715/758 |
| 7,551,935 B2 | 6/2009 | Karmarkar | |
| 7,580,719 B2 | 8/2009 | Karmarkar | |
| 2002/0077135 A1* | 6/2002 | Hyon | 455/466 |
| 2002/0110248 A1* | 8/2002 | Kovales et al. | 381/56 |
| 2002/0123899 A1* | 9/2002 | Hall et al. | 705/1 |
| 2002/0173294 A1 | 11/2002 | Nemeth et al. | |
| 2002/0187794 A1 | 12/2002 | Fostick et al. | |
| 2002/0193996 A1* | 12/2002 | Squibbs et al. | 704/260 |
| 2002/0198715 A1 | 12/2002 | Belrose | |
| 2003/0023424 A1 | 1/2003 | Weiner | |
| 2003/0078033 A1 | 4/2003 | Sauer et al. | |
| 2003/0085989 A1 | 5/2003 | Tay | |
| 2003/0125927 A1 | 7/2003 | Seme | |
| 2003/0144895 A1 | 7/2003 | Aksu et al. | |
| 2003/0186716 A1 | 10/2003 | Dorenbosch et al. | |
| 2003/0207701 A1 | 11/2003 | Rolnik et al. | |
| 2003/0236658 A1 | 12/2003 | Yam | |
| 2004/0024683 A1 | 2/2004 | Morciniec et al. | |
| 2004/0034561 A1 | 2/2004 | Smith | |
| 2004/0044517 A1 | 3/2004 | Palmquist | |
| 2004/0092272 A1 | 5/2004 | Valloppillil | |
| 2004/0102201 A1 | 5/2004 | Levin | |
| 2004/0102956 A1 | 5/2004 | Levin | |
| 2004/0110493 A1 | 6/2004 | Alvarez et al. | |
| 2004/0122979 A1 | 6/2004 | Kirkland | |
| 2004/0158471 A1 | 8/2004 | Davis et al. | |
| 2004/0179545 A1 | 9/2004 | Erola et al. | |
| 2004/0194141 A1 | 9/2004 | Sanders | |
| 2004/0215526 A1 | 10/2004 | Luo et al. | |
| 2004/0221256 A1 | 11/2004 | Martin et al. | |
| 2004/0221260 A1 | 11/2004 | Martin et al. | |
| 2004/0235503 A1 | 11/2004 | Koponen et al. | |
| 2004/0236244 A1* | 11/2004 | Allen et al. | 600/532 |
| 2004/0236710 A1* | 11/2004 | Clary et al. | 706/46 |
| 2004/0248591 A1 | 12/2004 | Fish | |
| 2004/0253963 A1 | 12/2004 | Park et al. | |
| 2004/0266462 A1 | 12/2004 | Chava et al. | |
| 2005/0003837 A1 | 1/2005 | Midkiff et al. | |
| 2005/0004840 A1 | 1/2005 | Wanninger | |
| 2005/0027608 A1 | 2/2005 | Wiesmuller et al. | |
| 2005/0038892 A1 | 2/2005 | Huang et al. | |
| 2005/0066044 A1 | 3/2005 | Chaskar et al. | |
| 2005/0128967 A1 | 6/2005 | Scobbie | |
| 2005/0164703 A1* | 7/2005 | Huynh | 455/432.3 |
| 2005/0171944 A1 | 8/2005 | Palmquist | |
| 2005/0191963 A1 | 9/2005 | Hymes | |
| 2005/0198304 A1 | 9/2005 | Oliver et al. | |
| 2005/0262204 A1* | 11/2005 | Szeto et al. | 709/206 |
| 2005/0267749 A1 | 12/2005 | Yamada et al. | |
| 2006/0019724 A1* | 1/2006 | Bahl et al. | 455/574 |
| 2006/0135181 A1 | 6/2006 | Dale et al. | |
| 2006/0154642 A1* | 7/2006 | Scannell, Jr. | 455/404.1 |
| 2006/0167992 A1 | 7/2006 | Cheung et al. | |
| 2006/0212621 A1 | 9/2006 | Ash et al. | |
| 2007/0027673 A1 | 2/2007 | Moberg | |
| 2007/0032244 A1* | 2/2007 | Counts et al. | 455/456.1 |
| 2007/0076877 A1 | 4/2007 | Camp et al. | |
| 2007/0130170 A1 | 6/2007 | Forney | |
| 2007/0208813 A1 | 9/2007 | Blagsvedt et al. | |
| 2007/0271340 A1* | 11/2007 | Goodman et al. | 709/206 |
| 2008/0005068 A1 | 1/2008 | Dumais et al. | |
| 2008/0025482 A1 | 1/2008 | Susama et al. | |
| 2008/0043718 A1 | 2/2008 | Chu | |
| 2008/0055264 A1* | 3/2008 | Anzures et al. | 345/173 |
| 2008/0059152 A1 | 3/2008 | Fridman et al. | |
| 2008/0076409 A1 | 3/2008 | Hinrikus et al. | |
| 2008/0133228 A1 | 6/2008 | Rao | |
| 2008/0133336 A1 | 6/2008 | Altman et al. | |
| 2008/0171555 A1* | 7/2008 | Oh et al. | 455/456.1 |
| 2008/0243619 A1 | 10/2008 | Sharman et al. | |
| 2008/0311934 A1 | 12/2008 | Soderstrom | |
| 2009/0036097 A1* | 2/2009 | Satou | 455/411 |
| 2009/0055739 A1 | 2/2009 | Murillo et al. | |
| 2009/0082042 A1 | 3/2009 | Harendra et al. | |
| 2009/0124272 A1 | 5/2009 | White et al. | |
| 2009/0129372 A1 | 5/2009 | Pandey et al. | |
| 2009/0147778 A1 | 6/2009 | Wanless et al. | |
| 2009/0163183 A1 | 6/2009 | O'Donoghue et al. | |
| 2009/0175499 A1 | 7/2009 | Rosenblatt | |
| 2009/0254529 A1 | 10/2009 | Goldentouch | |
| 2009/0282030 A1 | 11/2009 | Abbot et al. | |
| 2010/0048290 A1 | 2/2010 | Baseley et al. | |

OTHER PUBLICATIONS

"About ContractBuddy"; http://www,contractbuddy.com/aboutCB/features.htm, Mar. 22, 2005.

"Electronic negotiations, media, and transactions in socioeconomic interactions"; Yuan; http://intemeg.org!enegotiation|resources|online_info,html, Dec. 2002.

"Distributed PeCo-Mediator: Finding Partners via Personal Connections" Ogata etal.; 0-7803-3280-6/95/$5.00 1996IEEE.

"What Can Computer Programs Do to Facilitate Negotiation Processes?"; Chaudhury. et al.; 1991 ACM 0-89791-456-2/91/0010/0269.

"Speech Centric Multimodal Interfaces for Mobile Communication Systems"; Kvale et al.; Telektronikk Feb. 2003; p. 104-117.

"Google SMS: How to Use"; http://www.google.com/sms|howtouse.html, Feb. 4, 2005.

Author(s) unknown, Voice SMS—Client & Clientless Solutions Fun Talk SMS, V2V SMS, VoiceSMSData Sheet 1 ,publication date unknown (copyright 2008), published by Movius.

Yasuto Nakanishi et al "Context Aware Messaging Service:A Dynamic Messaging Delivery Using Location Information and Schedule Information," Personal Technologies (2000)Abstract.

* cited by examiner

| TEXT MESSAGE COMPONENT 500 | CONTEXT DATA 502 | | | | | |
|---|---|---|---|---|---|---|
| | GPS DATA 504 | WIFI LOCATION DATA 506 | RFID LOCATION DATA 508 | SOCIAL NETWORKING PAGE HYPERLINK 510 | BLOG WEBPAGE HYPERLINK 512 | SENDER'S BIOGRAPHICAL INFORMATION 514 |
| HERE | 1 | 1 | 0 | 0 | 0 | 0 |
| ME | 0 | 0 | 0 | 1 | 1 | 1 |
| I | 0 | 0 | 0 | 0 | 0 | 1 |
| HERE ABOUTS | 1 | 0 | 1 | 0 | 0 | 0 |

FIGURE 5

BIOSENSOR MEASUREMENTS INCLUDED IN THE ASSOCIATION OF CONTEXT DATA WITH A TEXT MESSAGE

CLAIM OF PRIORITY

This application is also a continuation-in-part of and claims priority to patent application Ser. No. 12/422,313 filed on Apr. 13, 2009 which claims priority from provisional application 61/161,763 filed on Mar. 19, 2009, patent application Ser. No. 12/422,313 is a continuation-in-part of Ser. No. 11/519,600 filed Sep. 11, 2006, which was patented as U.S. Pat. No. 7,551,935, which is a continuation-in-part of Ser. No. 11/231,575 filed Sep. 21, 2005 which was patented as U.S. Pat. No. 7,580,719.

FIELD OF TECHNOLOGY

This disclosure relates generally to a computerized communication system, and, more particularly, to a system, a method and an article of manufacture of association of context data with a text message component.

BACKGROUND

A computer system such as a mobile device (e.g. a smart phone) may include sensors. The sensors may detect attributes of the computer system's environment and transform the attributes into context data. The computer system may also be communicatively coupled with an external server and/or database (e.g. via the Internet). The external server and/or database may provide additional context data to the computer system. For example, the computer system may use the external server and/or database to acquire additional information about the context data acquired by the sensors.

At the same time, the computer system may also include a text messaging application. A user of the computer system may compose and send text messages. Portions of the text messages may be related to certain context data available and/or stored in the computer system. This context data may be useful to a receiver when reviewing the text message. Without the available context data, the receiver may not understand the text message. The receiver may need to query the sending user with additional questions (e.g. other text messages, cell phone calls, etc.) to clarify the meaning of the text message.

SUMMARY

A system, method, and article of manufacture of an association of context data with a text-message component are disclosed. In one aspect, a context data is associated with a text-message component. The association between the context data and the text-message component may be indicated with a user interface. The association between the context data and the text-message component may be embedded in a text-message signal. The association between the context data and the text-message component may be embedded in a short message service (SMS) signal.

In another aspect, a computer system having a graphical user interface (GUI) comprising a display and a selection device renders a text-message component on a GUI. A context-data icon is rendered on the GUI. A context-data measurement associated with the text-message component is rendered. The context-data icon is transformed according to the context-data measurement.

The computer system may comprise a mobile device. The context-data icon may be transformed if a user-controlled pointer is passed over the text-message component. The context-data icon may be rendered as a set of bars. The context-data measurement may be provided by a sending mobile device or a server communicatively coupled to a text messaging network through which the text-message component is transmitted to the computer system. A window in the GUI that comprises information related to the context data may be rendered. A hyperlink to a webpage comprising additional information related to the context data may be provided. The webpage may comprise a social networking webpage of a sender of the text-message component. An interface element of the GUI may be rendered to allow selection of the text-message component. A GUI widget may be provided to enable selection of a context-data icon graphic.

In yet another aspect, a computer system comprises at least one processor configured to render a text-message component on a GUI. The processor also renders a context-data icon on the GUI and retrieves a context data availability associated with the text-message component. The processor transforms a context data indicator according to the context data availability. The computer system also includes a processor readable memory and a context data sensor configured to acquire a context data current to a context of the computer system. A user input device is also included in the computer system along with a display device.

The computer system may comprise a smart phone. The context data indicator may comprise a graphical icon rendered in the GUI by the processor. The computer system may include a speaker. The context data indicator may comprise an audio signal propagated by the speaker of the smart phone.

In still yet another aspect, a text message application is provided. A portion of a text message generated by the text message application is analyzed. A context data that relates to the portion of the text message is acquired. The context data is linked to the portion of the text message.

A linkage of the context data and the portion of the text message may be signified with a user interface. The context data may be acquired with a sensor of a mobile device. The context data may be acquired from a database in the mobile device. The context data may be acquired from a third-party database. The portion of the text message may be linked to the context data after the text message has been generated. The portion of the text message may be linked to the context data during the composition of the text message. The linkage of the context data and the portion of the text message may be transmitted to another mobile device. The linkage of the context data and the portion of the text message may be transmitted to a server.

BRIEF DESCRIPTION OF THE DRAWINGS

The embodiments of this invention are illustrated by way of example and not limitation in the figures of the accompanying drawings, in which like references indicate similar elements and in which:

FIG. 5 shows a database table correlating a text message component with a type of context data, according to one embodiment.

Other features of the present embodiments will be apparent from the accompanying drawings and from the detailed description that follows.

DETAILED DESCRIPTION

Disclosed are a system, method, and article of manufacture of an association of context data with a text-message component. Although the present embodiments have been described with reference to specific example embodiments, it will be evident that various modifications and changes may be made to these embodiments without departing from the broader spirit and scope of the various claims.

Figure 1:
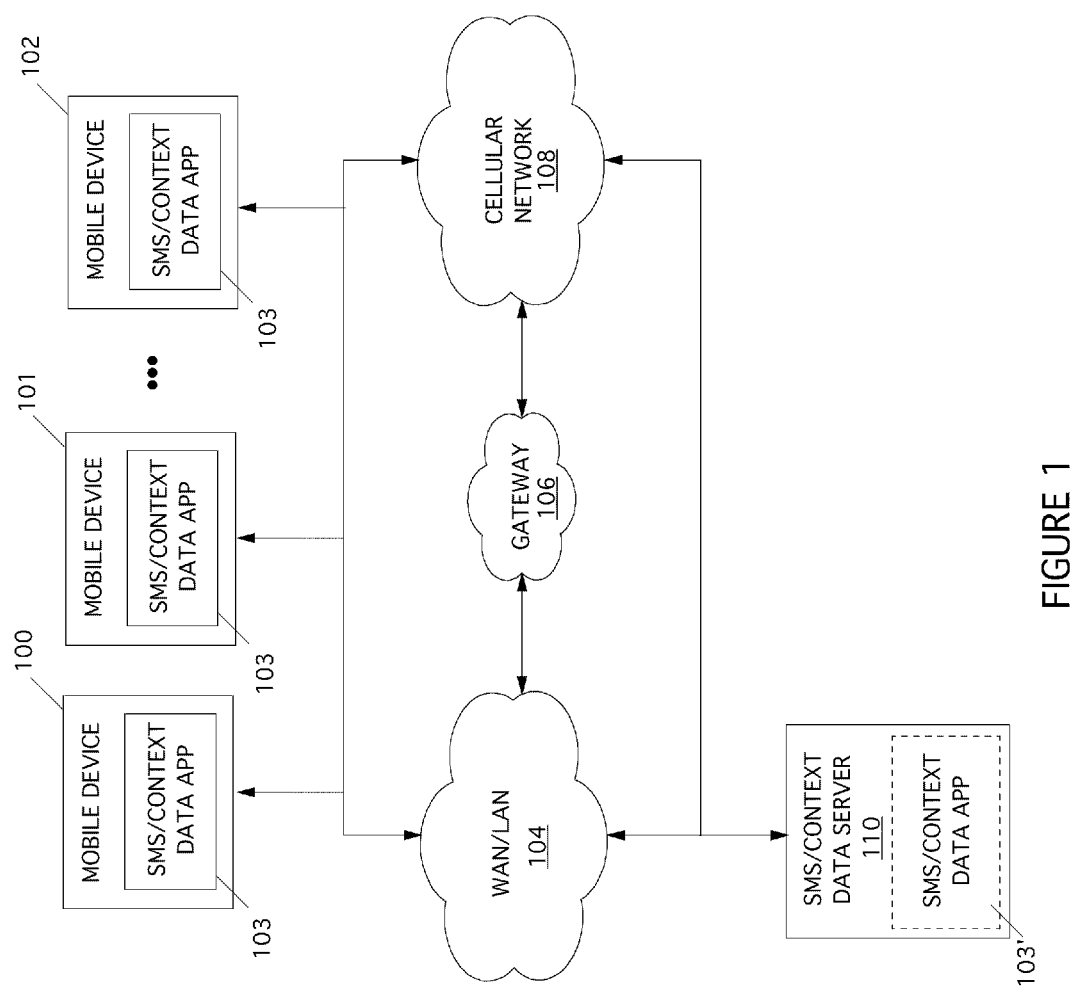
FIG. 1 is a functional block diagram generally illustrating a text messaging system for enabling text messaging between computing systems, according to one embodiment.

FIG. 1 is a functional block diagram generally illustrating a text messaging system for enabling text messaging between computing systems, according to one embodiment. By way of example, the text messaging system is a short message service (SMS) system. However, it should be noted that in other example embodiments, the text message system may be configured to utilize other forms of text messaging, inter alia, a multimedia messaging service (MMS), an enhanced messaging service (EMS), text messages delivered via a packet-switched data-network communication service and/or text messages delivered via other types of circuit-switched data-network communication services. For example, in certain example embodiments, the term 'text message' may also include a social network status update and/or a microblog post.

Figure 3:
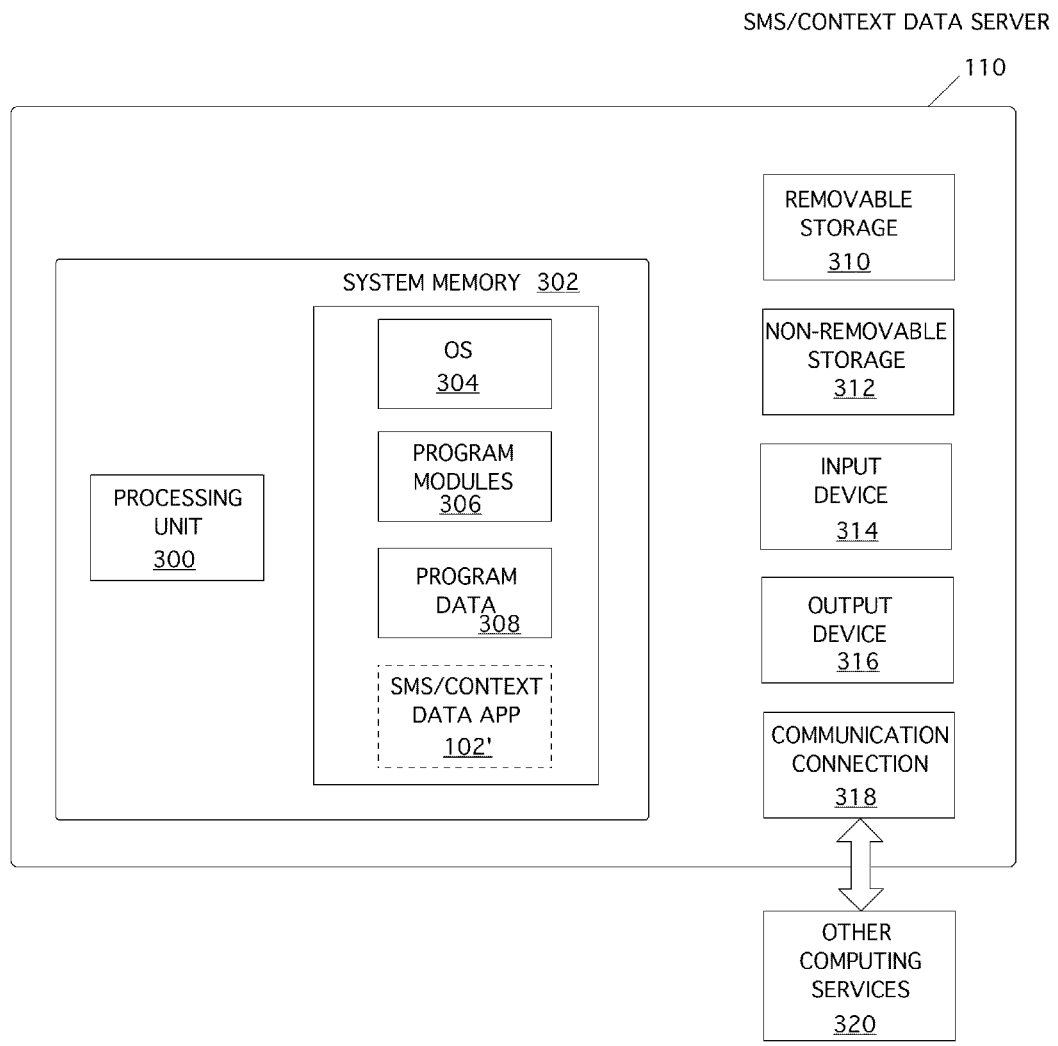
FIG. 3 is a functional block diagram of an exemplary computing device such as the SMS/Context Data Server, according to one embodiment.

The mobile devices 100 101 and 102 are mobile computing devices (e.g. a smart phone such as the iPhone™, Motorola Droid™, Blackberry™, or Nexus One™) such as the one described in conjunction with FIG. 3 infra. It should be noted that in other example embodiments, another type of computing device (e.g. a personal computer, a tablet computer, a portable media player, personal digital assistant, and/or Wi-Fi mobile platform) may be configured to transmit and receive text messages as well as include the context-meter application 103. Consequently, FIG. 1 should not be interpreted as being exclusive only to mobile devices with regards to other example embodiments.

The mobile devices 100 101 and 102 can be communicatively coupled to the wide area/local area network (WAN and LAN respectively) 104 and the cellular network 108. The mobile devices 100 101 and 102 are capable of interfacing with the WAN/LAN 104 utilizing a wireless, packet-based communication service such as the General Packet Radio Services (GPRS). The mobile devices 100 101 and 102 are also capable of utilizing a Global System for Mobile Communications (GSM) standard for other circuit/switch network communications such as voice and SMS. It should be noted that the embodiments should not be limited to GPRS and GSM only. For example, in certain example embodiments, Enhanced Data rates for GSM Evolution (EDGE), LTE Advanced, IEEE 802.16, an IP Multimedia Subsystem (IMS), and/or other wireless broadband standards and communication technologies may be utilized to improve data transmission rates.

Each mobile device includes a context-meter application 103. According to one embodiment, the context-meter application 103 provides context data metrics of a text message (e.g. an association between a context data with a component of a text message). The context-meter application 103 renders a user interface (e.g. a GUI) that represents context data information, text message information and/or context data metrics. In one example embodiment, the context-meter application 103 of the sending mobile device may algorithmically determine the association of the context data with the component of a text message during and/or after the composition of the text message. In another example embodiment, the context-meter application 103 allows a user to manually determine the association of the context data with the component of a text message. For example, the context-meter application 103 may render a context meter icon in a window of the GUI. The context-meter application 103 may also present interface elements (e.g. widgets such as windows, pointers, text boxes, buttons, hyperlinks, drop-down lists, check boxes, radio buttons and datagrids) that allow a user to provide input to the context-meter application 103. In response to the input, the context-meter application 103 may render additional information (e.g. maps, blogs, social networking website information, user biographical information, sender biographical information) related to the text message component. Additional examples of the functionality of the context-meter application 103 and the GUI are provided infra.

The WAN/LAN 104 may include various combinations of (e.g. WANs, LANs, metropolitan area networks, the Internet, etc.) according to the various embodiments. For example, the WAN may be utilized to interconnect various LANs and/or to connect a LAN to the Internet. In certain example embodiments, text messages may be transmitted between the mobile devices 100 101 and 102 via the WAN/LAN 104 as well as the Internet.

The gateway 106 routes messages between the WAN/LAN 104 and the cellular network 108 (or, other example embodiments, between the cellular network 108 and the Internet). For example, the mobile device 100 may send an email mobile device 101. The gateway 106 provides a means for transporting the email from the WAN/LAN 104 to cellular network 108. The gateway 106 also allows hyperlink text protocol (HTTP) messages to be transferred between WAN/LAN 104 (or the Internet) and the cellular network 108. The gateway 106 may interface different protocols used by the WAN/LAN 104 and the cellular network 108. For example, the gateway 106 may include protocol translators, impedance matching devices, rate converters, fault isolators and/or signal translators as necessary to provide system interoperability between the WAN/LAN 104 and the cellular network 108.

The mobile devices 100 101 and 102 can be communicatively coupled to the cellular network 108. An example cellular network 108 is a radio network made up of a number of radio cells each served by at least one transceiver located in a base station. The cellular network 108 delivers SMS messages, context data and context data metrics to and from the mobile devices 100 101 and 102 and the SMS/context data server 110. The cellular network 108 may also include other components such as a network switching subsystem (NSS), a short message server center (SMSC) to provide SMS services, a mobile switching center (MSC) and/or a public switched telephone network (PSTN). In one example embodiment, the SMSC receives and services incoming SMS messages, context data and context data metrics. The SMSC then forwards the SMS message, context data and context data metrics to the SMS/context data server 110. It should be noted that in certain example embodiments, the cellular network 108 can also transmit other types of a text messaging and media utilizing other technologies such as Multimedia Messaging Service (MMS), Enhanced Messaging Service (EMS) and/or Instant Message (IM).

In one embodiment, the SMS/Context Data Server 110 is configured as a server according to the description of FIG. 3 provided infra. The SMS/Context Data Server 110 is communicatively coupled with the WAN/LAN 104 and the Cellular Network 108. The SMS/Context Data Server 110 may also include a database to store data (e.g. user information data, historical context data, historical SMS data, etc.). The SMS/Context Data Server 110 parses, decodes and analyzes the SMS message (or EMS, MMS or IM message data in certain example embodiments), context data and the context data metrics. In certain embodiments, the SMS/Context Data Server 110 may augment the context data metrics to include additional information obtained from the database, third-party servers and/or the Internet. In another embodiment, the SMS/Context Data Application 102' may be a software component residing on the SMS/Context Data Server 110. The context-meter application 103' is configured to perform substantially the same functionalities as the context-meter application 103 described supra except in the computing environment of a server system as opposed to a mobile device. However, not all embodiments utilize the SMS/Context Data Server 110. For example, the SMS/Context Data Server 110 may be utilized to augment the battery power and/or processing power of the mobile device 100.

Figure 2:
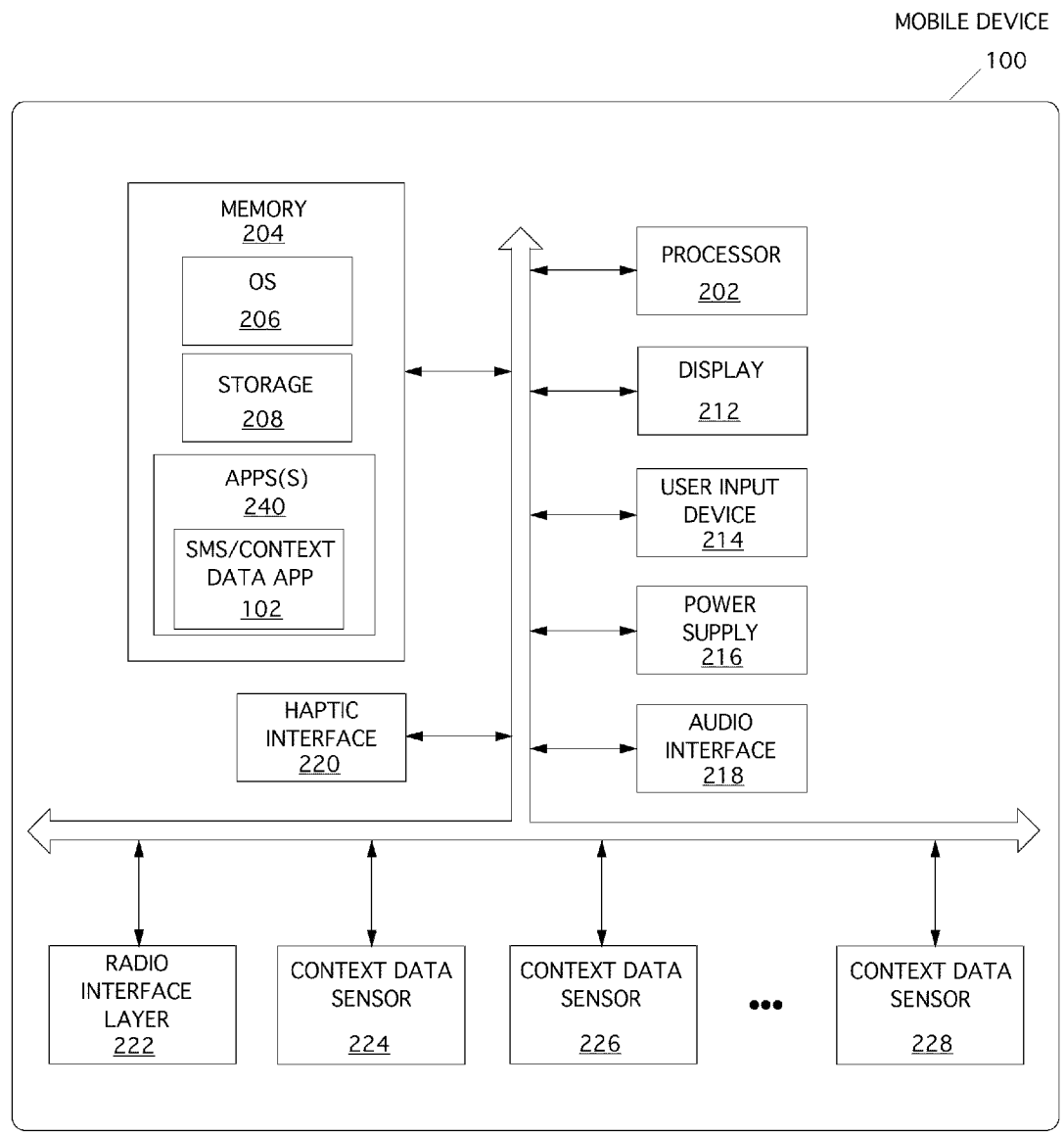
FIG. 2 is a functional block diagram of an exemplary mobile device such as mobile device, according to one embodiment.

FIG. 2 is a functional block diagram of an exemplary mobile device, such as mobile device 100, according to one embodiment. The mobile device 100 has a processor 202, a memory 204, a display 212, and a user input device 214. The memory 204 generally includes both volatile memory (e.g., RAM) and non-volatile memory (e.g., ROM, Flash Memory, or the like). The mobile device 100 includes an operating system 206 which is resident in the memory 204 and executes on the processor 202. The user input device 214 may be a push button numeric dialing pad (such as on a typical telephone), a multi-key keyboard (such as a conventional keyboard). The display 212 may be a liquid crystal display, or any other type of display commonly used in mobile devices. The display 212 may be touch-sensitive (e.g. a capacitive touchscreen), and would then also act as an input device. One or more application programs 210 are loaded into memory 204 and run on the operating system 206. The application programs 210 include the context-meter application 103 and other context data acquisition and analysis programs. Example application programs 210 include phone dialer programs, email programs, scheduling programs, PIM (personal information management) programs, word processing programs, spreadsheet programs, Internet browser programs, instant messaging programs, and so forth. In one example embodiment, the context data may be acquired from these application programs 210.

The mobile device 100 also includes storage 208 within the memory 204. In an example embodiment, the storage 208 may be a non-volatile form of computer memory. The storage 208 may be used to store persistent information which should not be lost if the mobile device 100 is powered down. In another example embodiment, the storage 208 may store context data information such as data derived from a context-data sensor described infra.

The applications 210 may use and store information in the storage 208, such as e-mail or other messages used by an e-mail application, contact information used by a PIM, appointment information used by a scheduling program, documents used by a word processing program, instant messaging information used by an instant messaging program, context data, context data metrics and the like. The mobile device 100 has a power supply 216, which may be implemented as one or more batteries. The power supply 216 might further include an external power source, such as an AC adapter or a powered docking cradle that supplements or recharges the batteries. The mobile device 100 is also shown with an audio interface 218 and a haptic interface 220. The audio interface 218 may be used to provide audible signals to and receive audible signals from the user. For example, the audio interface 218 may be coupled to a speaker for providing audible output and to a microphone for receiving audible input, such as to facilitate a telephone conversation. The haptic interface 220 may be used to provide haptic signals to the user. In another example embodiment, the context-meter application 103 may generate an audio and/or a haptic signal with a magnitude related to a value of a context data metric. The mobile device 100 also includes a radio interface layer 222 that performs the function of transmitting and receiving radio frequency communications. The radio interface layer 222 facilitates wireless connectivity between the mobile device 100 and the outside world, via a communications carrier or a service provider. Transmissions to and from the radio interface layer 222 are conducted under control of the operating system 206. In other words, communications received by the radio interface layer 222 may be disseminated to application programs 216 via the operating system 206, and vice versa.

The mobile device 100 further includes at least one context data sensor. In other example embodiments, the mobile device 100 may include a plurality of context-data sensors 224 226 and 228. In one embodiment, the context-data sensor 224 may be a device that measures an attribute of the mobile device's environment and then converts the attribute into a signal which can be read by the mobile device 100. Examples of a context-data sensor include, inter alia, global positioning system receivers, accelerometers, inclinometers, position sensors, near-field communication (NFC) sensors, barometers, WiFi sensors, RFID sensors, gyroscopes, pressure sensor, pressure gauges, time pressure gauges, torque sensors, ohmmeters, thermometers, infrared sensors, microphones, image sensors (e.g. digital cameras), biosensors (e.g. photometric biosensors, electrochemical biosensors), capacitance sensors, radio antennas and/or capacitance probes. It should be noted that the other sensor devices other than those listed may also be utilized to sense context data. In other certain example embodiments, context data may also include a signal comprising information about another mobile device and/or an external computing system such as the SMS/Context Data Server 110, a third-party server (e.g. an internet map server) or a database (e.g. the storage 208 and/or a database external to the mobile device 100).

FIG. 3 is a functional block diagram of an exemplary computing device, such as the SMS/Context Data Server 110, according to one embodiment. In a basic configuration, the SMS/Context Data Server 110 typically includes at least one processing unit 300 and system memory 302. Depending on the exact configuration and type of computing device, system memory 302 may be volatile (such as RAM), non-volatile (such as ROM, flash memory, etc.) or some combination of the two. System memory 302 typically includes an operating system 304, one or more program modules 306, and may include program data 308. The system memory 302 may also include the context-meter application 102'. The SMS/Context Data Server 110 may have additional features or functionalities. For example, SMS/Context Data Server 110 may also include additional data storage devices (removable and/or non-removable) such as, for example, magnetic disks, optical disks, or tape. Such additional storage is illustrated in FIG. 3 by removable storage 310 and non-removable storage 312. Computer storage media may include volatile and nonvolatile, removable and non-removable media implemented in any method or technology for storage of information, such as computer readable instructions, data structures, program modules, or other data. The system memory 302, removable storage 310 and non-removable storage 312 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which storage media may be part of the SMS/Context Data Server 110. The SMS/Context Data Server 110 may also have input device(s) 314 such as keyboard, mouse, pen, voice input device, touch input device, etc. Output device(s) 316 such as a display, speakers, printer, etc. may also be included. These devices are well known in the art and need not be discussed at length here.

The SMS/Context Data Server 110 may also include communication connections 318 that allow the device to communicate with other computing devices over a network (e.g. the Internet, the WAN/LAN 104 and the cellular network 108). Communication connections 318 are one example of communication media. Communication media may typically be embodied by computer readable instructions, data structures, program modules, or other data in a modulated data signal, such as a carrier wave or other transport mechanism, and includes any information delivery media (e.g. see the description of the exemplary customized SMS message provided infra in the description of FIG. 4). The "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. The computer readable media as used herein may include both storage media and communication media according to various example embodiments.

Figure 4:
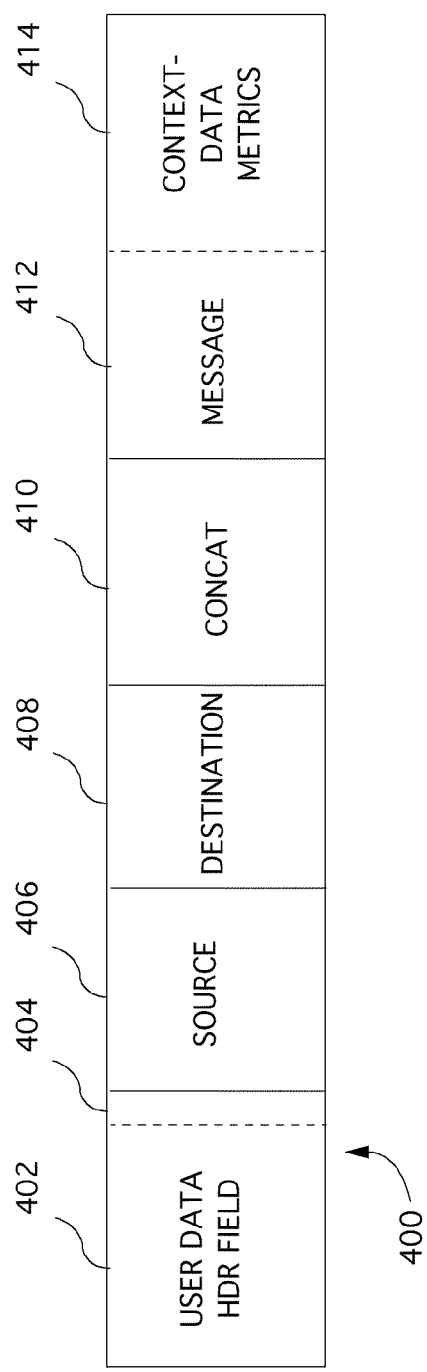
FIG. 4 is a graphical representation generally illustrating the salient portions of a sample customized SMS message suitable for an example embodiment utilizing SMS as the text messaging technology, according to one embodiment.

FIG. 4 is a graphical representation generally illustrating the salient portions of a sample customized SMS message suitable for an example embodiment utilizing SMS as the text messaging technology, according to one embodiment. FIG. 4 is provided by way of example and not of limitation. Generally, SMS may comprise a communication service standardized in the GSM mobile communication system, using standardized communications protocols allowing the interchange of short text messages between certain computerized communication (e.g. mobile telephone devices, servers, personal computers, etc.).

Generally, there are three types of SMS messages: GSM character set-encoded messages (effectively 7-bit encoded text), UCS2-encoded messages (Unicode encoded 16-bit text), and 8-bit binary-encoded messages. Typically, GSM-encoded messages and UCS2-encoded messages are textual and are displayed to the user by a messaging application as soon as they are received, whereas 8-bit binary encoded messages are generally directed at providing device-specific information, such as device configuration messages.

As shown, the sample customized SMS message 400 includes a user data header field 402, a source field 406, a destination field 408, a concatenation field 410 and a message field 412. The user data header field 402 includes a message type field 404. In accordance with an example embodiment, the message type field 404 stores an identifier identifying the SMS message 400 as a context-enriched SMS message. Additionally, in one embodiment, context data metrics 414 may be included in the message field 412. It should be noted that other example embodiments utilizing MMS and/or EMS text messaging technology may use other modalities to transmit a text message and associated context data metrics. Moreover, other certain example embodiments utilizing IMS technology may use other modalities to transmit a text message and associated context data metrics.

FIG. 5 shows a database table correlating a text message component 500 with a type of context data 502, according to one embodiment. Column one includes fields for text message components 500. Columns two to seven 504-514 include fields for correlating the text message component 500 with a particular context data 504-514. In one example embodiment, the context-meter application 103 may access the database table to determine which types of context data to associate with particular text message components 500. Additionally, in one example embodiment, a context meter icon may indicate a context data magnitude according to the sum of the rows of context data of the same row as the text message component. For example, the sum of the rows of the context data of the same row as the text message component 'here' is two. Accordingly, the context meter may indicate a context data magnitude associated with this value.

Figure 6:
FIG. 6 is a screen view of an exemplar GUI rendered by the context-meter application of a sending mobile device, according to one embodiment.

FIG. 6 is a screen view of an exemplar GUI rendered by the context-meter application 103 of a sending mobile device 102, according to one embodiment. The GUI generally comprises a context data window 600, a text message 602 and a set of context meter icons 604A-604B. The context data window 600 on the screen generally displays context data and user interaction information. In certain embodiments where the text message is an MMS or EMS message the context data window 600 may also include media of the MMS or EMS message. A user may use an interface element (e.g. a widget or a user input device) to access controls of rendered within the context data window and/or select a text message component. For example, when constructing a text message and associating context data with the text message components, the user may select a particular text message component 'me'. In the present example, the context-meter application 103 then allows the user to take a digital photograph and/or a digital video that comprises the context data associated with the text message component 'me'. The context meter icons 604A and 604B indicate the present magnitude of the context data associated with the text message components. For example, in the present example, the context meter icon 604A indicates that the text message component 'Meet' does not have any associated context data. The context meter icon 604B indicates that the text message component 'me' has two context data attributes associated with it.

Figure 7:
FIG. 7 is a screen view of an exemplar GUI rendered by the context-meter application of a receiving mobile device, according to one embodiment.

FIG. 7 is a screen view of an exemplar GUI rendered by the context-meter application 103 of a receiving mobile device 102, according to one embodiment. The GUI generally comprises a context data window 700, a text message 702 and a set of context meter icons 704A-704B. The context data window 700 on the screen generally displays context data and user interaction information. In certain embodiments where the text message is an MMS or EMS message the context data window 700 may also include media of the MMS or EMS message. A user may use an interface element (e.g. a widget or a user input device) to access controls of rendered within the context data window and/or select a text message component. For example, when reviewing a text message and associating context data with the text message components, the user may select a particular text message component 'me'. In the present example, the context-meter application 103 then renders a set of context data icons that link to context data files and/or hyperlinks associated with the text message component 'me'. Example context data files and/or hyperlinks include, inter alia, hyperlinks to social networking pages, web logs, digital photographs and/or videos that have been associated with the user identified by the text message component 'me'. In one example embodiment, certain context data such as digital photographs and/or videos may not be embedded with the text message signal, but rather stored in a server 110. Instructions to access the digital photographs and videos from the server 110 may be embedded in the text message. The context meter icons 704A and 704B indicate the present magnitude of the context data associated with the text message components. In the present example, the context meter icon 704A indicates that no context data is associated with the text message component 'Meet'. The context meter icon 704B indicates that the text message component 'me' has a magnitude of four bars of context data attributes associated with it. The context-meter application 103 renders the present view of the context data window 700 when a user selects the text message component 'me'.

It should also be noted, that the context meter icons may be rendered in a variety of graphical designs, audio and/or haptic patterns. Furthermore, in some example embodiments, the context-meter application 103 may provide an application for customization of the context data meter.

Figure 8:
FIG. 8 is a screen view of an exemplar GUI rendered by the context-meter application of a receiving mobile device, according to one embodiment.

FIG. 8 is a screen view of an exemplar GUI rendered by the context-meter application 103 of a receiving mobile device 100 according to one embodiment. The GUI generally comprises a context data window 800, a text message 802 and a set of context meter icons 804A-804B. The context data window 800 on the screen generally displays context data and user interaction information (e.g. a web browser, historical information provided by a server and/or information provided by a third-party database obtained by the serve). Particularly, FIG. 8 shows the context data window 800 after a user has selected a hyperlink to a web log (i.e. a blog) provided by the context data window 800. The mobile device 100 has connected to the Internet and downloaded the web blog document referenced by the hyperlink. The web blog document is then rendered in the context data window 800 independently of the text message 802 and the context meter icons 804A-804B. In this particular example, the text message 802 and the context meter icons 804A-804B maintain the same representation as in FIG. 7. However, in other example embodiments, the GUI of the mobile device 100 may present only a web browser with the web blog web page.

Figure 9:
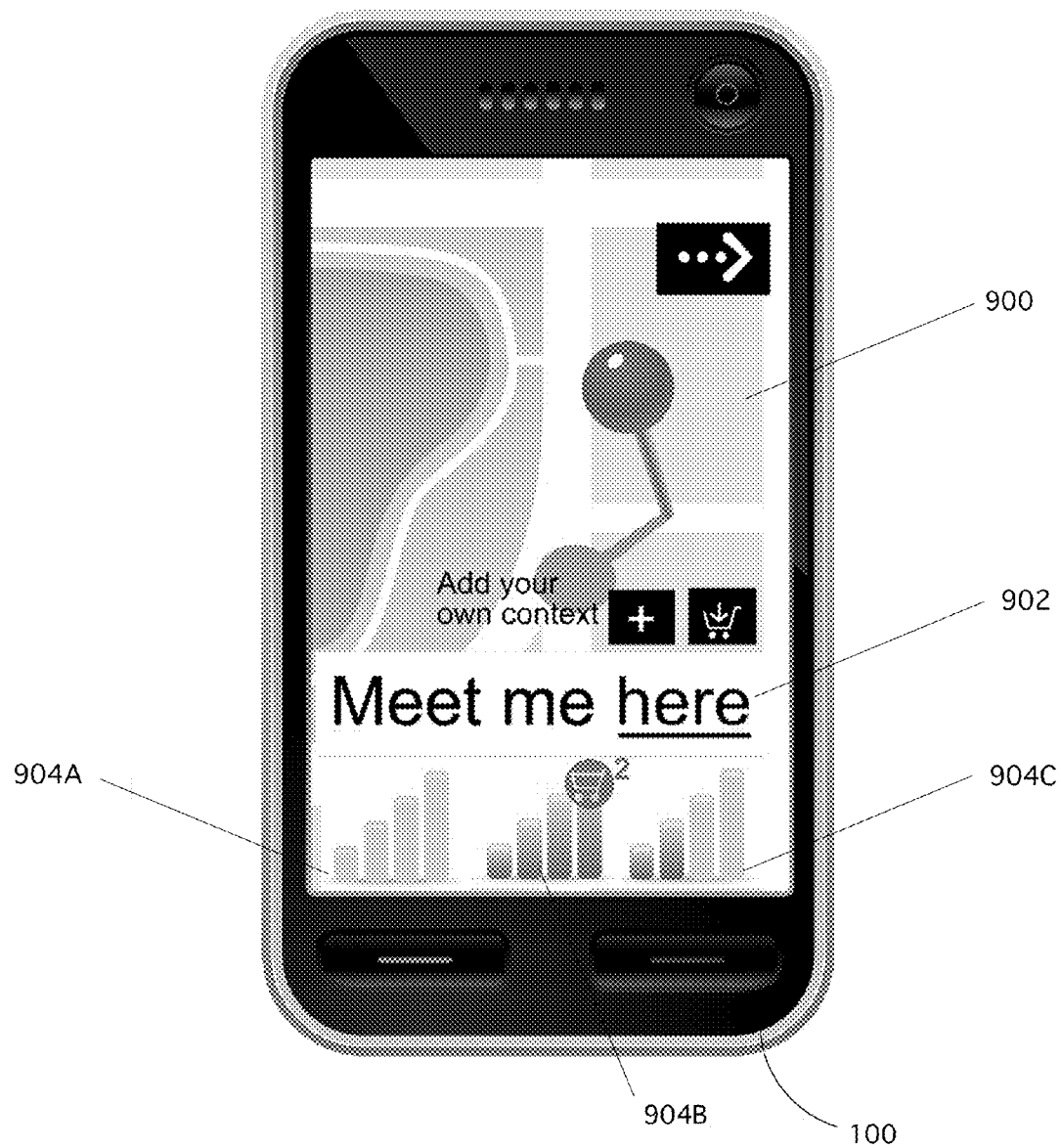
FIG. 9 is a screen view of an exemplar GUI rendered by the context-meter application of a receiving mobile device, according to one embodiment.

FIG. 9 is a screen view of an exemplar GUI rendered by the context-meter application 103 of a receiving mobile device 100, according to one embodiment. The GUI generally comprises a context data window 900, a text message 902 and a set of context meter icons 904A-904C. The context data window 900 on the screen generally displays context data and user interaction information (e.g. a web browser, historical information provided by a server and/or information provided by a third-party database obtained by the serve). Particularly, FIG. 9 shows the context data window 900 after a user has selected a hyperlink to a web mapping service application such as Google Maps™. The mobile device 100 has connected to the Internet and downloaded the web mapping document referenced by the hyperlink. The web mapping document is then rendered in the context data window 900 independently of the text message 902 and the context meter icons 904A-904C. The text message component 'here' has been associated with a location by the context-meter application 103 of the sending device 102. For example, the context-meter application 103 of the sending device 102 may have utilized GPS and/or Wi-Fi location data to determine the location of the sending device. In one embodiment, the context-meter application 103 of the sending device 102 may have embedding this location context data in the text message.

In another embodiment, the context-meter application 103 of the sending device 102 may have embedded a reference to the location context data in the text message and transmitted the location context data to the server 110. The receiving device 100 may then utilized the reference information to obtain the location context data from the server 110.

Figure 10:
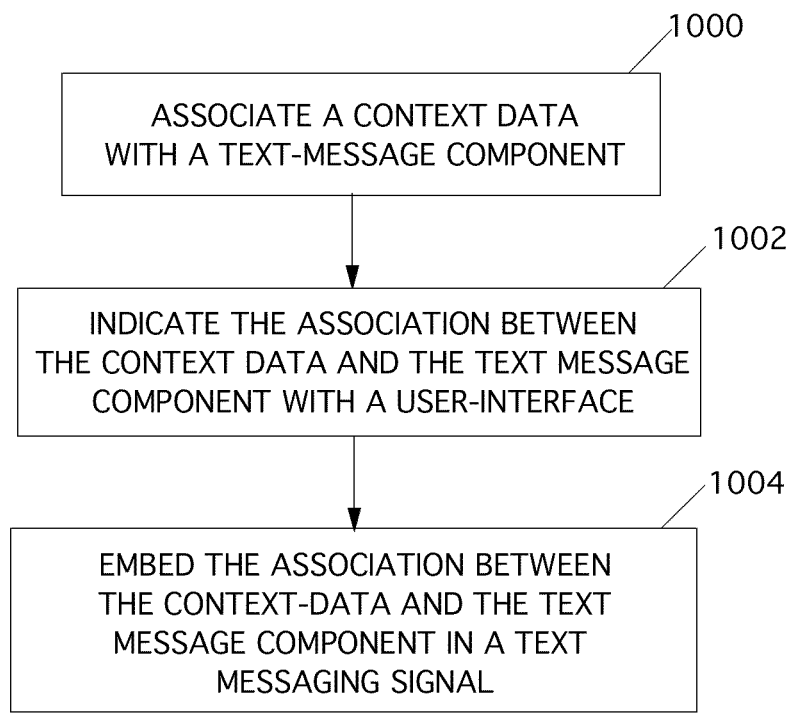
FIG. 10 is a flow chart that describes the steps of a method of one embodiment.

FIG. 10 is a flow chart that describes steps of a method of one embodiment. In operation 1000, a context data is associated with a text-message component. The context-meter application 103 may be used to perform operation 1000. In operation 1002, the association between the context data and the text-messaging component with a user interface is indicated. In one embodiment, the mobile device of FIG. 2 may be utilized to perform operation 1002. In another embodiment, the computer system of FIG. 3 may be utilized to perform operation 1002. In operation 1004, the association between the context data and the text-messaging component is embedded in a text message signal. In one embodiment, the text-message signal may be an SMS signal. Additionally, in one example embodiment, the devices of FIG. 1 may be utilized to perform operations 1000-1004.

Although the present embodiments have been described with reference to specific example embodiments, various modifications and changes may be made to these embodiments without departing from the broader spirit and scope of the various embodiments. For example, the various devices, modules, etc. described herein may be enabled and operated using hardware circuitry (e.g., CMOS based logic circuitry), firmware, software or any combination of hardware, firmware, and software (e.g., embodied in a machine readable medium).

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:
1. A method of a mobile device comprising:
 automatically detecting a text message component in a text message drafted with a mobile device, wherein the text message component is drafted with a text-messaging application of the mobile device by the user of the mobile device, and wherein the text message component comprises a term in the memory of the mobile device that is used to match the text message component with a biosensor data;

automatically correlating the text message component with the biosensor data, wherein the use of the biosensor data is automatically determined by the text-message component;

associating the biosensor data with the text message component, wherein the biosensor data comprises a biosensor measurement that is automatically obtained from a biosensor that measures an attribute of the user of the mobile device, indicating the association between the biosensor data and the text-message component with a user interface of the mobile device; and graphically indicating a magnitude of the available biosensor data associated with the text-message component.

2. The method of claim 1, wherein the user manually associates the biosensor data with the text message component.

3. The method of claim 2, wherein the biosensor data comprises an analytical biosensor data.

4. In a mobile device having a graphical user interface (GUI) comprising a display and a selection device, a method comprising:

rendering a user-generated text-message component on a GUI, wherein the text-message component is drafted with a text-messaging application of the mobile device by a user of a mobile device, and wherein the text-message component comprises a term in the memory of the mobile device that is used to automatically correlate the text-message component with a biosensor-data type;

automatically rendering a biosensor-data icon on the GUI;

automatically determining the biosensor-data type relationally linked with the user-generated text-message component, wherein the use of the biosensor-data type is automatically determined by the text-message component;

retrieving a biosensor-data measurement associated with the text-message component, wherein the biosensor-data measurement is comprised of the biosensor-data type relationally linked with the user-generated text-message component, wherein the biosensor-data provides information of an attribute of an environment of a mobile device, and wherein the biosensor-data measurement is retrieved from the memory of the mobile device; and transforming the biosensor-data icon according to the biosensor data measurement.

5. The method of claim 4, wherein the sensor comprises a near field communication (NFC) device.

6. The method of claim 4 further comprising:
transforming the biosensor-data icon if a user-controlled pointer is passed over the text-message component.

7. The method of claim 4, wherein the biosensor comprises an electrochemical biosensor.

8. The method of claim 4 thither comprising:
rendering a window in the GUI that comprises information related to the biosensor data.

9. The method of claim 8 further comprising:
providing a hyperlink to a webpage comprising additional information related to the biosensor data.

10. The method of claim 9, wherein the webpage comprises a social networking webpage of a sender of the text-message component.

11. The method of claim 4 further comprising:
rendering an interface element of the GUI to allow selection of the text message component.

12. The method of claim 4 further comprising:
providing a GUI widget to enable selection of a biosensor-data icon graphic.

13. A mobile device comprising:
at least one processor configured to:
render a user-composed text-message component on a graphical user interface (GUI), wherein the text-message component is drafted with a text-messaging application of the mobile device by a user of the mobile device, and wherein the text-message component comprises a term in a memory of the mobile device that is used to match the text-message component with a biosensor-data type;

automatically render a biosensor-data icon on the GUI;

automatically retrieve a biosensor data availability associated with the text-message component from a biosensor of the mobile device when the text-message component is automatically related to the biosensor data, wherein the biosensor data provides information of an attribute of an environment of a mobile device, and wherein the biosensor data availability is retrieved from the memory of the mobile device; and transform a biosensor data indicator according to the biosensor data availability;

a processor readable memory;
a biosensor, configured to;
  acquire the biosensor data;
a user input device; and
a display device.

14. The mobile device of claim 13, wherein the mobile device comprises a smart phone.

15. The mobile device of claim 14, wherein the biosensor acquires an attribute of the user that composed the text-message component.

16. The mobile device of claim 14 further comprising:
a speaker, and
wherein the biosensor data indicator comprises an audio signal propagated by the speaker of the smart phone.

17. A method comprising:
providing a text message application of a mobile device;
automatically obtaining a portion of a user-composed text message generated by the text message application, and wherein the portion of the user-composed text message comprises a term in a memory of the mobile device that is used to match the portion of a user-composed text message with a biosensor data;

automatically determining the biosensor data that relates to the portion of the user-composed text message;

automatically acquiring the biosensor data wherein the biosensor data comprises a sender attribute;

automatically linking the biosensor data to the portion of the text message; and signifying a linkage of the biosensor data and the portion of the text message with a user interface.

18. The method of claim 17, wherein the photometric biosensor or the electrochemical biosensor is communicatively coupled with the mobile device.

19. The method of claim 17, wherein the photometric biosensor or the electrochemical biosensor data is acquired with a near-field communication (NFC) device in the mobile device.

20. The method of claim 17, wherein the photometric biosensor or the electrochemical biosensor data is in the mobile device.

21. The method of claim 17, wherein the portion of the text message is linked to the photometric biosensor or the electrochemical biosensor data during the composition of the text message.

22. The method of claim 17 further comprising:
transmitting the linkage of the photometric biosensor or the electrochemical biosensor data and the portion of the text message to another mobile device in an short message service (SMS) message.

23. The method of claim 17 further comprising:
transmitting the linkage of the photometric biosensor or the electrochemical biosensor data and the portion of the text message to a server.

24. The method of claim 23, wherein the text-message comprises a multimedia messaging service (MMS) message.

25. The method of claim 17 further comprising a computer usable medium having a non-transitory signal computer readable program code embodied therein, said computer readable program code adapted to be executed to implement the method of claim 17.

* * * * *